United States Patent
Hisatsugu et al.

(10) Patent No.: US 11,713,871 B2
(45) Date of Patent: Aug. 1, 2023

(54) DISPLAY DEVICE

(71) Applicant: DENSO CORPORATION, Kariya (JP)

(72) Inventors: Shinsuke Hisatsugu, Kariya (JP); Yasuhiro Kobayashi, Kariya (JP); Takahira Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/694,880

(22) Filed: Mar. 15, 2022

(65) Prior Publication Data
US 2022/0205626 A1    Jun. 30, 2022

Related U.S. Application Data

(63) Continuation of application No. PCT/JP2020/034117, filed on Sep. 9, 2020.

(30) Foreign Application Priority Data

Sep. 17, 2019    (JP) .................. 2019-168430

(51) Int. Cl.
*F21V 29/67*    (2015.01)
*B60H 1/00*    (2006.01)

(52) U.S. Cl.
CPC ....... *F21V 29/677* (2015.01); *B60H 1/00271* (2013.01)

(58) Field of Classification Search
CPC ................... F21V 29/677; B60H 1/00271
See application file for complete search history.

(56) References Cited

FOREIGN PATENT DOCUMENTS

| JP | 2014213826 A | 11/2014 | |
|----|--------------|---------|--|
| JP | 2015058874 A | 3/2015 | |
| JP | 2017151381 A | 8/2017 | |
| WO | WO-2017199655 A1 * | 11/2017 | ............... B60H 1/34 |

OTHER PUBLICATIONS

English translation of WO 2017199655 (Year: 2017).*

* cited by examiner

*Primary Examiner* — Anne M Hines
(74) *Attorney, Agent, or Firm* — Harness, Dickey & Pierce, P.L.C.

(57) ABSTRACT

A display device for a vehicle includes: an irradiation unit configured to irradiate a display light for an occupant of the vehicle to display an image; and a storage unit housing the irradiation unit so as to expose a display screen to which the display light is irradiated. The storage unit has an air intake port to take in air and an air discharge port to discharge the air. The display device includes a confluence portion configured to merge a first exhaust air discharged from the air discharge port and a second exhaust air discharged from an air conditioner for a cabin of the vehicle through an air outlet arranged in the cabin. The confluence portion is defined such that a first flow direction of the first exhaust air and a second flow direction of the second exhaust air coincide with each other.

8 Claims, 6 Drawing Sheets

DISPLAY DEVICE

CROSS REFERENCE TO RELATED APPLICATIONS

The present application is a continuation application of International Patent Application No. PCT/JP2020/034117 filed on Sep. 9, 2020, which designated the U.S. and claims the benefit of priority from Japanese Patent Application 2019-168430 filed on Sep. 17, 2019. The entire disclosures of all of the above applications are incorporated herein by reference.

TECHNICAL FIELD

The present disclosure relates to a display device for a vehicle.

BACKGROUND ART

A display device for a vehicle has a heat-dissipating fin on the back surface of the display device.

SUMMARY

According to an aspect of the present disclosure, a display device for a vehicle includes:
an irradiation unit configured to irradiate a display light for an occupant of the vehicle to display an image;
a storage unit housing the irradiation unit so as to expose a display screen to which the display light is irradiated, the storage unit having an air intake port to take in air and an air discharge port to discharge the air; and
a confluence portion configured to merge a first exhaust air discharged from the air discharge port and a second exhaust air discharged from an air conditioner for a cabin of the vehicle through an air outlet arranged in the cabin.

The confluence portion is defined such that a first flow direction in which the first exhaust air flows and a second flow direction in which the second exhaust air flows coincide with each other.

DESCRIPTION OF EMBODIMENT

Figure 1:
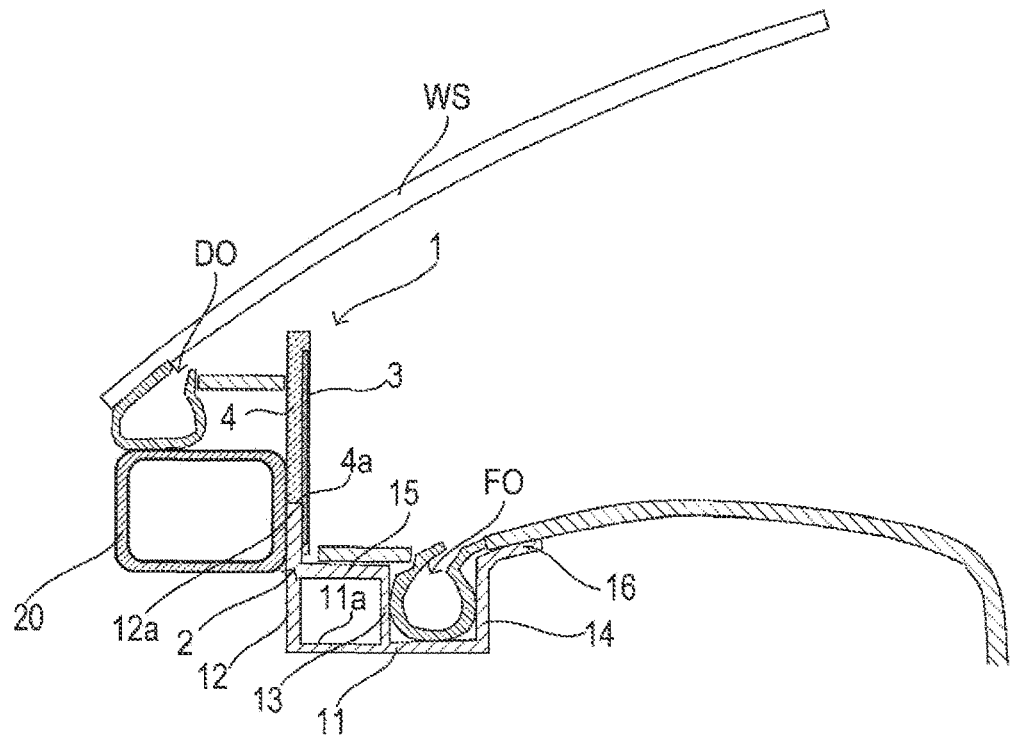
FIG. 1 is a cross-sectional view illustrating a display device according to a first embodiment.

To begin with, examples of relevant techniques will be described.

In recent years, in-vehicle display devices have become larger, more vivid and more bright. The amount of heat generated by ECUs, drawing ICs, power supply circuits in addition to the in-vehicle display devices increases. As a result, in the in-vehicle display device, the temperature becomes locally high due to heat concentration, and the temperature distribution difference is large between some places. In such a place, due to the heat or difference in linear expansion, elements may be damaged, the fastening and fitting may be loosened, and the bonded portion may be peeled off. In addition, since the in-vehicle display device is placed on the design surface of the instrument panel, the heat received from outside light is also increasing. As a result of detailed examination by the inventors, the display device may be damaged due to the high temperature.

The present disclosure provides a display device in which the heat dissipation efficiency is improved.

According to an aspect of the present disclosure, a display device for a vehicle has a display unit and a support unit.

The display unit is configured to display an image for an occupant of the vehicle.

The support unit is formed of a heat-conducting material, and is configured to support the display unit so that the display unit is fixed in the cabin of the vehicle. The support unit is arranged so as to be in contact with components made of a heat-conducting material and mounted on the vehicle.

In the display device of the present disclosure, the support unit that supports the display unit is formed of a heat-conducting material, and the support unit is in contact with the components formed of the heat-conducting material. Therefore, the heat generated in the display unit is conducted through the support unit and released to the components of the vehicle. Thereby, the display device of the present disclosure can improve the heat dissipation efficiency.

According to another aspect of the present disclosure, a display device for a vehicle has an irradiation unit, a storage unit, and a confluence portion.

The irradiation unit is configured to irradiate the occupant of the vehicle with display light for displaying an image.

The storage unit is configured to store the irradiation unit so that the display screen to which the display light is irradiated is exposed. The storage unit has an air intake port for taking in air and an air discharge port for discharging the air taken into the storage unit.

The confluence portion is configured to merge a first exhaust air discharged from the air discharge port and a second exhaust air discharged from an air conditioner mounted on the vehicle through an air outlet installed in the cabin of the vehicle. A first flow direction in which the first exhaust air flows coincides with a second flow direction in which the second exhaust air flows.

In the display device of the present disclosure, an air flow path is formed inside the storage unit in which the irradiation unit is housed, and air flows through the air flow path from the air intake port to the air discharge port. When the air flowing through the air flow path (hereinafter referred to as internal circulation air) comes into contact with the irradiation unit, the heat generated in the irradiation unit is transferred to the internal circulation air and released from the air discharge port to the outside of the storage unit.

The confluence portion merges the first exhaust air and the second exhaust air, such that the first flow direction of the first exhaust air discharged from the air discharge port and the second flow direction of the second exhaust air discharged from the air outlet coincide with each other. Thereby, the display device of the present disclosure can increase the circulation speed of the first exhaust air by utilizing the negative pressure generated by the flow of the second exhaust air. Since the circulation speed of the first exhaust air becomes higher, the circulation speed of the internal circulation air becomes higher than the circulation speed due to self-convection. Therefore, the amount of the internal circulation air in contact with the irradiation unit increases, and heat generated in the irradiation unit can be more released to the outside of the storage unit. Thereby, the display device of the present disclosure can improve the heat dissipation efficiency.

First Embodiment

Hereinafter, a first embodiment of the present disclosure will be described with reference to the drawings.

As shown in FIG. 1, a display device 1 of the first embodiment is installed below a windshield WS of a vehicle, and includes a back frame 2, a display unit 3, and a heat insulating casing 4.

The back frame 2 is made of metal, and includes a bottom surface portion 11, vertical surface portions 12, 13, 14, and horizontal surface portions 15, 16.

The bottom surface portion 11 is a plate-shaped member arranged at the lowest position on the back frame 2. The bottom surface portion 11 is arranged so that a surface 11a of the bottom surface portion 11 opposes the windshield WS.

The vertical surface portion 12 is a plate-shaped member arranged so as to extend from the front end of the bottom surface portion 11 toward the windshield WS along a direction perpendicular to the surface 11a of the bottom surface portion 11.

The vertical surface portion 13 is a plate-shaped member arranged so as to extend from a rear side of the vertical surface portion 12 toward the windshield WS along a direction perpendicular to the surface 11 a of the bottom surface portion 11. The length of the vertical surface portion 13 extending from the surface 11 a of the bottom surface portion 11 is shorter than the length of the vertical surface portion 12 extending from the surface 11 a of the bottom surface portion 11.

The vertical surface portion 14 is a plate-shaped member arranged so as to extend from the rear end of the bottom surface portion 11 toward the windshield WS along a direction perpendicular to the surface 11a of the bottom surface portion 11. The length of the vertical surface portion 14 extending from the surface 11 a of the bottom surface portion 11 is shorter than the length of the vertical surface portion 12 extending from the surface 11 a of the bottom surface portion 11.

The horizontal surface portion 15 is a plate-shaped member arranged so as to extend from the upper end of the vertical surface portion 13 to the vertical surface portion 12 along a direction perpendicular to the surface of the vertical surface portion 13.

The horizontal surface portion 16 is a plate-shaped member arranged so as to extend from the upper end of the vertical surface portion 14 rearward of the vehicle along a direction substantially perpendicular to the surface of the vertical surface portion 14.

The display unit 3 is an organic EL display in which plural organic EL elements are arranged in a matrix and formed in a thin plate shape, and outputs a display light. Further, the display unit 3 may be of another type such as a μ-LED display or a TFT.

The heat insulating casing 4 is formed of a material having heat insulating properties, or is formed in a shape having a heat insulating layer or an air layer. The heat insulating casing 4 covers a region formed in a thin plate shape, other than the display surface of the display unit 3. That is, the heat insulating casing 4 covers a back surface and a side surface of the display unit 3.

The heat insulating casing 4 has a joint 4a which can be fitted with the upper end portion 12a of the vertical surface portion 12. The joint 4a is located at, for example, a lower portion of a region covering the back surface of the display unit 3 or an arbitrary area adjacent to the display unit 3, such as outer peripheral frame portion or back surface.

The upper end portion 12a of the vertical surface portion 12 and the fitting portion 4a of the heat insulating casing 4 are fitted with each other, so that the display unit 3 is supported by the back frame 2 with the display screen facing the rear side of the vehicle.

A space between the vertical surface portion 13 and the vertical surface portion 14 forms a face outlet FO to blow air toward the upper body of the occupant of the vehicle.

A defroster outlet DO is formed at the front side of the display unit 3 and the heat insulating casing 4 to blow air toward the windshield WS.

An air conditioning duct 20 is arranged at the front side of the display unit 3 and the heat insulating casing 4 to circulate air discharged from an air conditioner (not shown) into the cabin. The air conditioning duct 20 is formed in a tubular shape with a heat-transmitting material (for example, an existing duct material or a material having improved heat-conducting property). A part of the outer peripheral surface of the air conditioning duct 20 is in contact with the back frame 2.

The display device 1 configured in this way includes the display unit 3 and the back frame 2.

The display unit 3 displays an image for the occupant of the vehicle. The back frame 2 is made of a heat-transmitting material (metal in this embodiment), and supports the display unit 3 so that the display unit 3 is fixed in the cabin of the vehicle. The back frame 2 is arranged so as to be in contact with the air conditioning duct 20. The air conditioning duct 20 is made of a heat-conducting material and is mounted on the vehicle.

In the display device 1, the back frame 2 that supports the display unit 3 is formed of a heat-transmitting material, and the back frame 2 is in contact with the air conditioning duct 20 formed of a heat-transmitting material. Therefore, the heat generated in the display unit 3 is conducted through the back frame 2 and released to the air conditioning duct 20. As a result, the display device 1 can improve the heat dissipation efficiency.

In this embodiment, the back frame 2 corresponds to a support unit, and the air conditioning duct 20 corresponds to a component of a vehicle.

Second Embodiment

Hereinafter, a second embodiment of the present disclosure will be described with reference to the drawings. Note that in the second embodiment, portions different from the first embodiment are described. The same reference numerals are given to common components.

Figure 2:
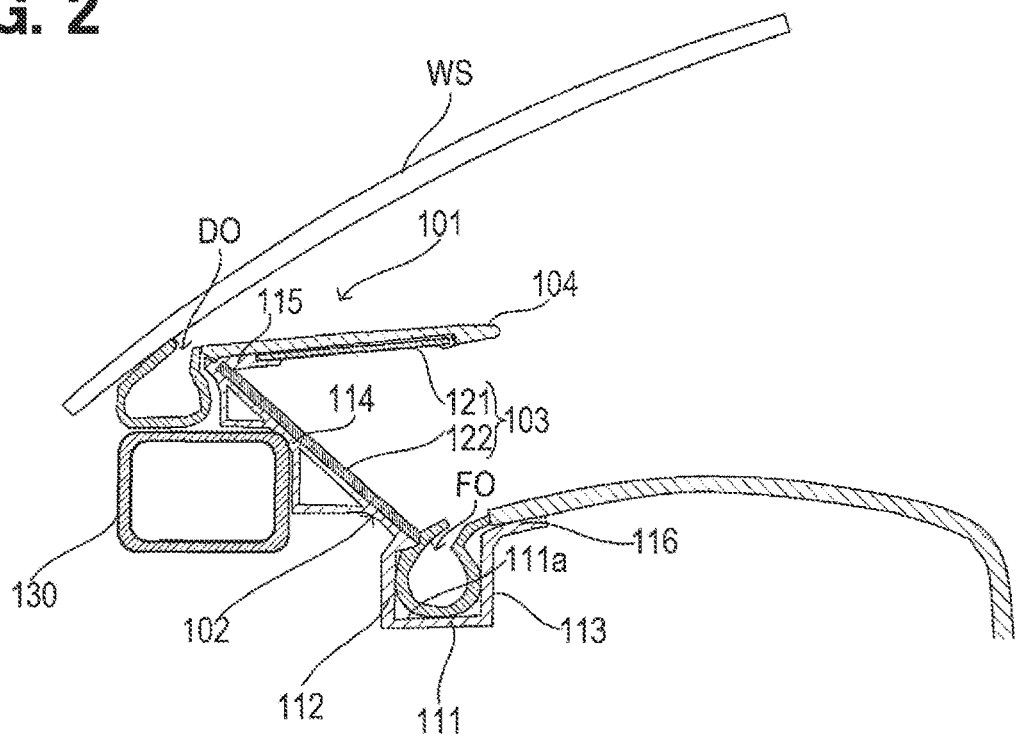
FIG. 2 is a cross-sectional view illustrating a display device according to a second embodiment.

As shown in FIG. 2, a display device 101 of the second embodiment is installed below the windshield WS of the vehicle, and includes a back frame 102, a display unit 103, and a heat insulating visor 104.

The back frame 102 is made of metal, and includes a bottom surface portion 111, vertical surface portions 112, 113, a slope portion 114, and horizontal surface portions 115, 116.

The bottom surface portion 111 is a plate-shaped member arranged at the lowest position of the back frame 102. The bottom surface portion 111 is arranged so that a surface 111a of the bottom surface portion 111 opposes the windshield WS.

The vertical surface portion 112 is a plate-shaped member arranged so as to extend from the front end of the bottom surface portion 111 toward the windshield WS along a direction perpendicular to the surface 111a of the bottom surface portion 111.

The vertical surface portion 113 is a plate-shaped member arranged so as to extend from the rear end of the bottom surface portion 111 toward the windshield WS along a direction perpendicular to the surface 111a of the bottom surface portion 111. The length of the vertical surface portion 113 extending from the surface 111a of the bottom surface portion 111 is substantially equal to the length of the vertical surface portion 112 extending from the surface 111a of the bottom surface portion 111.

The slope portion 114 is a plate-shaped member extending from the upper end of the vertical surface portion 112 so as to approach the windshield WS along an oblique direction with respect to the extending direction of the vertical surface portion 112.

The horizontal surface portion 115 is a plate-shaped member arranged so as to extend from the upper end of the slope portion 114 rearward of the vehicle.

The horizontal surface portion 116 is a plate-shaped member arranged so as to extend from the upper end of the vertical surface portion 113 rearward of the vehicle along a direction substantially perpendicular to the surface of the vertical surface portion 113.

The display unit 103 includes an irradiation unit 121 and a reflecting mirror 122.

The irradiation unit 121 is an organic EL display in which plural organic EL elements are arranged in a matrix and formed in a thin plate shape, and outputs a display light. The irradiation unit 121 may be of another method such as a μ-LED display or a TFT.

The irradiation unit 121 is attached to the horizontal surface portion 115 installed to project rearward of the vehicle below the windshield WS so that the display screen faces downward.

The reflecting mirror 122 is attached to the upper surface of the slope portion 114 so that the reflecting surface faces upward. As a result, the reflecting mirror 122 reflects the display light emitted from the display screen of the irradiation unit 121 toward at least the driver seat of the vehicle.

The heat insulating visor 104 is made of a heat insulating material and is installed so as to cover the upper surface of the horizontal surface portion 115.

A face outlet FO is formed by the space between the vertical surface portion 112 and the vertical surface portion 113. A defroster outlet DO is formed at the front side of the display unit 3 and the heat insulating casing 4 to blow air toward the windshield WS.

An air conditioning duct 130 is arranged at the front side of the display unit 103 to circulate air discharged from an air conditioner (not shown) into the cabin. The air conditioning duct 130 is made of a heat-conducting material and is formed in a tubular shape. A part of the outer peripheral surface of the air conditioning duct 130 is in contact with the back frame 102.

The display device 101 configured in this way includes the display unit 103 and the back frame 102.

The display unit 103 displays an image for the occupant of the vehicle. The back frame 102 is made of a heat-transmitting material (metal in this embodiment), and supports the display unit 103 so that the display unit 103 is fixed in the cabin of the vehicle. The back frame 102 is arranged so as to be in contact with the air conditioning duct 130. The air conditioning duct 130 is made of a heat-conducting material and is mounted on the vehicle.

In the display device 101, the back frame 102 that supports the display unit 103 is formed of a heat-transmitting material, and the back frame 102 is in contact with the air conditioning duct 130 formed of a heat-transmitting material. Therefore, the heat generated by the display unit 103 is conducted through the back frame 102 and released to the air conditioning duct 130. As a result, the display device 101 can improve the heat dissipation efficiency.

An air conditioning duct and an air outlet from the air conditioner can be arranged on the back surface of the reflecting mirror 122 on which a virtual image is reflected. In the display device 101, unlike the existing meter (that is, display and pointer), the back surface of the reflecting mirror 122 defines an empty space without a mechanism or the like. With this empty space, the air conditioning duct can be arranged in an efficient straight shape without bending the air conditioning duct or significantly changing the thickness of the air conditioning duct. This makes it possible to eliminate the division of components at the bent portion of the air conditioning duct and to form a ventilation path with less pressure loss or resistance.

The back frame 102 is in contact with the irradiation unit 121, the reflecting mirror 122, the air conditioning duct 130, the heat insulating visor 104, and the face outlet FO. Therefore, heat is transferred among the irradiation unit 121, the reflecting mirror 122, the air conditioning duct 130, the heat insulating visor 104, and the face outlet FO. Thus, the heat dissipation of the irradiation unit 121 is improved. As a result, the display device 101 can further improve the heat dissipation efficiency of the irradiation unit 121.

In this embodiment, the back frame 102 corresponds to a support unit, and the air conditioning duct 130 corresponds to a component of a vehicle.

Third Embodiment

Hereinafter, a third embodiment of the present disclosure will be described with reference to the drawings.

Figure 3:
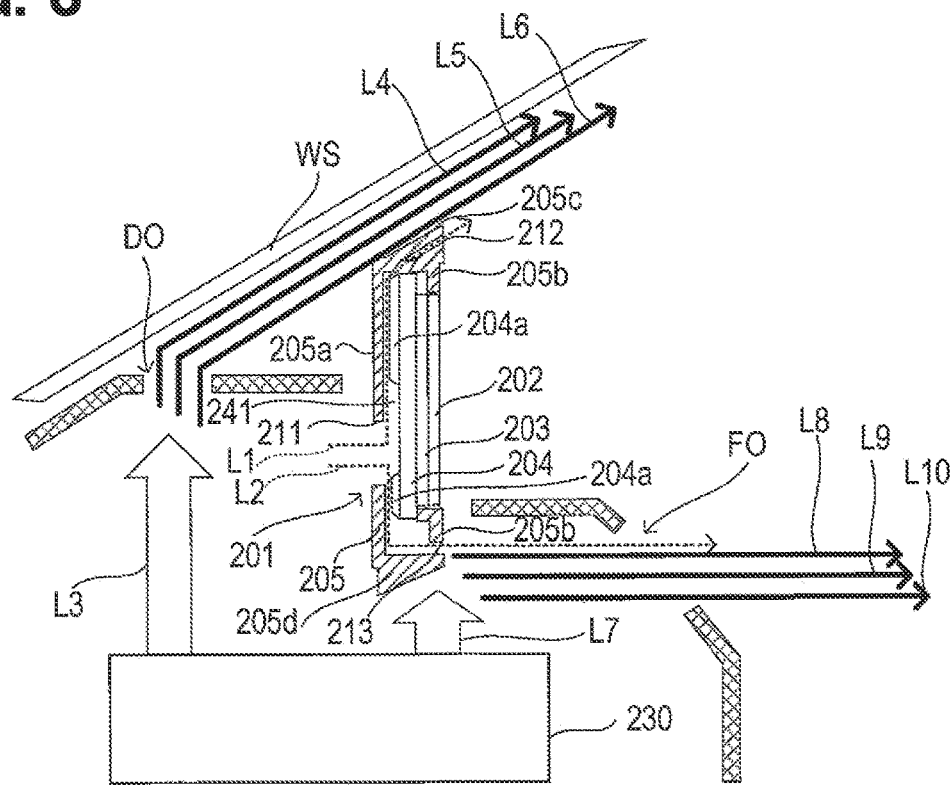
FIG. 3 is a cross-sectional view illustrating a display device according to a third embodiment.

As shown in FIG. 3, a display device 201 of the third embodiment is installed below the windshield WS of the vehicle, and includes a display 202, a circuit board 203, a back case 204, and a decorative panel 205.

The display 202 is an organic EL display in which plural organic EL elements are arranged in a matrix to form a thin plate.

The circuit board 203 is a wiring board on which various electronic components for controlling the display 202 are mounted. The circuit board 203 is installed on a side of the display 202 opposite to the display screen formed in a thin plate shape.

The back case 204 is formed in a plate shape with a material having high thermal conductivity. The circuit board 203 is interposed between the back case 204 and the display 202. The back case 204 includes a heat radiation fin 204a. The heat radiation fin 204a is formed so as to extend in the up-down direction. The back case 204 is interposed between the heat radiation fin 204a and the circuit board 203.

The decorative panel 205 houses the display 202, the circuit board 203, and the back case 204 so as to cover, other than the display screen of the display 202.

Further, the decorative panel 205 houses the display 202, the circuit board 203, and the back case 204 so that the back surface 205a of the decorative panel 205 is separated from the back case 204. As a result, an air layer 241 is formed between the decorative panel 205 and the back case 204.

An air intake port 211 penetrating the back surface 205a is formed on the back surface 205a of the decorative panel 205.

An air discharge port 212 penetrating the front surface 205b is formed at the upper end of the front surface 205b of the decorative panel 205. An air discharge port 213 penetrating the front surface 205b is formed at the lower end of the front surface 205b of the decorative panel 205.

The upper side surface of the decorative panel 205 has a tapered portion 205c whose length in the up-down direction increases from the back surface 205a to the front surface 205b. The taper angle of the tapered surface in the tapered portion 205c is set so as to be substantially parallel to the windshield WS.

The lower side surface of the decorative panel 205 has a tapered portion 205d whose length in the up-down direction decreases from the back surface 205a to the front surface 205b.

The penetration direction of the air discharge port 212 penetrating the front surface 205b is parallel to the tapered surface of the tapered portion 205c. The penetration direction of the air discharge port 213 penetrating the front surface 205b coincides with the horizontal direction.

As shown by the arrow L1, the air taken into the decorative panel 205 from the air intake port 211 passes between the decorative panel 205 and the back case 204 upward of the decorative panel 205. Further, the air passes through the air discharge port 212 and is discharged to the outside of the decorative panel 205.

Similarly, as shown by the arrow L2, the air taken into the decorative panel 205 from the air intake port 211 passes between the decorative panel 205 and the back case 204 downward of the decorative panel 205. Further, the air passes through the air discharge port 213 and is discharged to the outside of the decorative panel 205.

A defroster outlet DO is formed at the front side of the decorative panel 205 to blow air toward the windshield WS. A face outlet FO is formed at the rear side of the air discharge port 213. A part of the face outlet FO is arranged so as to face the air discharge port 213.

As indicated by the arrows L3, L4, L5, and L6, a part of the air discharged from an air conditioner 230 for a vehicle is discharged from the defroster outlet DO. Then, the air discharged from the defroster outlet DO flows along the inner surface of the windshield WS as shown by the arrows L4, L5, and L6.

As indicated by the arrows L7, L8, L9, and L10, a part of the air discharged from the air conditioner 230 is discharged from the face outlet FO. Then, the air discharged from the face outlet FO flows in the horizontal direction rearward of the vehicle as shown by the arrows L8, L9, and L10.

The display device 201 includes the display 202, the circuit board 203, the back case 204, the decorative panel 205, and the tapered portion 205c.

The display 202, the circuit board 203, and the back case 204 irradiate the occupant of the vehicle with display light for displaying an image.

The decorative panel 205 houses the display 202, the circuit board 203, and the back case 204 so that the display screen irradiated with the display light is exposed. The decorative panel 205 has the air intake port 211 for taking in air and the air discharge port 212 for discharging the air taken into the decorative panel 205.

The tapered portion 205c merges a first exhaust air discharged from the air discharge port 212 and a second exhaust air discharged from the air conditioner 230 and discharged from the defroster outlet DO such that a first flow direction through which the first exhaust air flows and a second flow direction through which the second exhaust air flows coincide with each other. The first exhaust air is air flowing along the direction indicated by the arrow L1. The first flow direction is indicated by the arrow L1. The second exhaust air is air flowing along the direction indicated by the arrows L4, L5, and L6. The second flow direction is indicated by the arrows L4, L5, and L6.

In the display device 201, an air flow path through which air flows from the air intake port 211 to the air discharge port 212 is formed inside the decorative panel 205 which houses the display 202, the circuit board 203, and the back case 204. When the air flowing through the air flow path (hereinafter referred to as internal circulation air) comes into contact with the display 202, the circuit board 203, and the back case 204, the heat generated in the display 202, the circuit board 203, and the back case 204 is transmitted to the internal circulation air and discharged from the air discharge port 212 to the outside of the decorative panel 205.

The tapered portion 205c is provided so that the first flow direction in which the first exhaust air discharged from the air discharge port 212 flows and the second flow direction in which the second exhaust air discharged from the defroster outlet DO flows coincide with each other. Then, the first exhaust air and the second exhaust air are merged. As a result, the display device 201 can increase the circulation speed of the first exhaust air by utilizing the negative pressure generated by the flow of the second exhaust air. Since the circulation speed of the first exhaust air becomes higher, the circulation speed of the internal circulation air becomes higher than the circulation speed due to self-convection. Thus, the amount of the internal circulation air in contact with the display 202, the circuit board 203 and the back case 204 increases. Accordingly, heat generated by the display 202, the circuit board 203 and the back case 204 can be more released to the outside of the decorative panel 205. As a result, the display device 201 can improve the heat dissipation efficiency.

Further, the tapered portion 205d merges the first exhaust air and the second exhaust air so that the first flow direction in which the first exhaust air discharged from the air discharge port 213 flows and the second flow direction in which the second exhaust air discharged from the face outlet FO flows coincide with each other. The first exhaust air is air flowing along the direction indicated by the arrow L2. The first flow direction is indicated by the arrow L2. The second exhaust air is air flowing along the direction indicated by the arrows L8, L9, and L10. The second flow direction is indicated by the arrows L8, L9, and L10.

As a result, the display device 201 can increase the circulation speed of the first exhaust air by utilizing the negative pressure generated by the flow of the second exhaust air, so that the heat dissipation efficiency can be improved.

Further, the air layer 241 is formed between the decorative panel 205 and the back case 204. As a result, the display device 201 can suppress the heat generated in the decorative panel 205 from being transmitted to the display 202, the circuit board 203, and the back case 204 when external light is irradiated to the back surface 205a of the decorative panel 205.

Further, the heat radiation fin 204a is formed so as to extend along the up-down direction. Therefore, the extending direction of the heat radiation fin 204a coincides with the flow direction of the air flowing from the air intake port 211 toward the air discharge port 212, 213. That is, the heat radiation fin 204a functions as a straightening vane in the air flow path, and can increase the flow rate of air in the air flow path.

In this embodiment, the display 202, the circuit board 203, and the back case 204 correspond to an irradiation unit, the decorative panel 205 corresponds to a storage unit, the tapered portion 205c, 205d corresponds to a confluence portion, and the defroster outlet DO and the face outlet FO correspond to an air outlet.

Fourth Embodiment

Hereinafter, a fourth embodiment of the present disclosure will be described with reference to the drawings. Note that in the fourth embodiment, parts different from the third embodiment will be described. The same reference numerals are given to common components.

Figure 4:
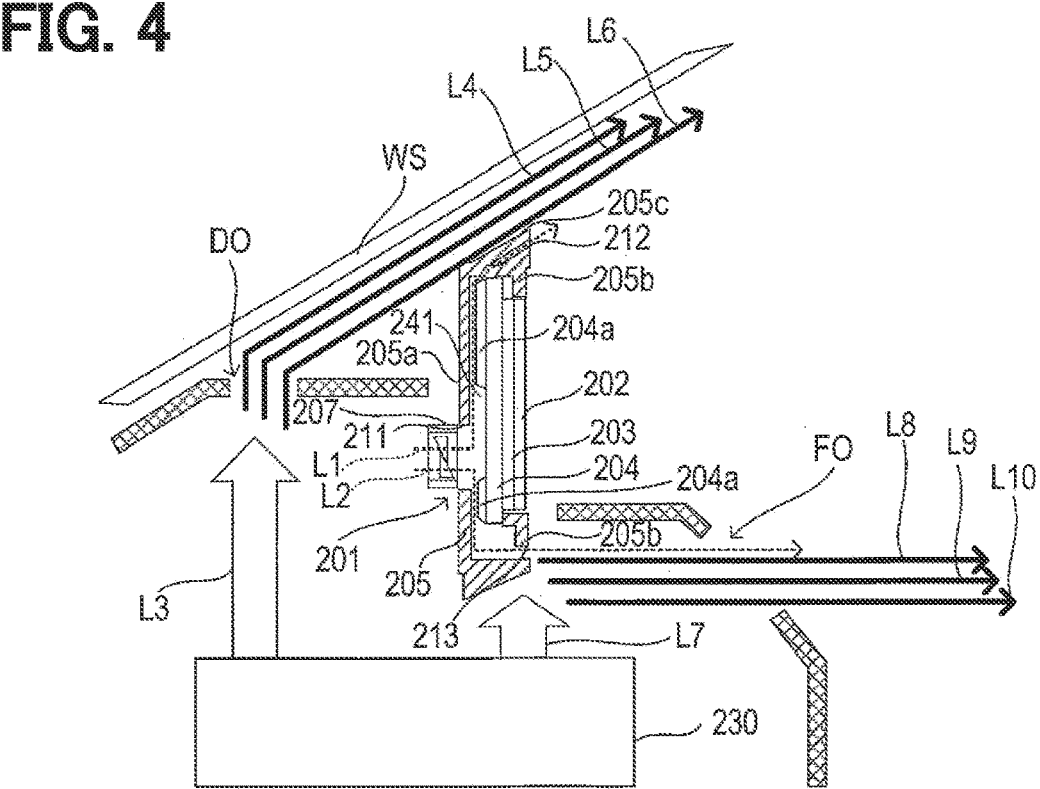
FIG. 4 is a cross-sectional view illustrating a display device according to a fourth embodiment.

As shown in FIG. 4, a forced air cooling fan 207 is added in the display device 201 of the fourth embodiment, compared with the third embodiment. The forced air cooling fan 207 is installed so as to block the air intake port 211.

The forced air cooling fan 207 forcibly takes in air into the decorative panel 205 by rotating the propeller to cause air to flow along the rotation axis direction of the propeller.

The display device 201 has the forced air cooling fan 207 installed in the air intake port 211. The forced air cooling fan 207 circulates the air so that the air outside the decorative panel 205 flows into the decorative panel 205 through the air intake port 211.

As a result, the display device 201 can raise the flow speed of the air flowing into the air intake port 211. Since the circulation speed of the air flowing into the air intake port 211 becomes higher, the circulation speed of the internal circulation air becomes higher than the circulation speed due to self-convection. Therefore, the amount of internal circulation air to be in contact with the display 202, the circuit board 203, and the back case 204 increases, and heat generated in the display 202, the circuit board 203, and the back case 204 can be more effectively released to the outside of the decorative panel 205. As a result, the display device 201 can further improve the heat dissipation efficiency.

Further, the forced air cooling fan 207 increases the amount of air flowing into the air intake port 211. Then, the first exhaust air discharged from the air discharge port 212 joins the second exhaust air discharged from the defroster outlet DO. Therefore, the amount of air flowing along the inner surface of the windshield WS increases. Therefore, the display device 201 can increase the range in which the fogging is wiped on the windshield WS.

In this embodiment, the forced air cooling fan 207 corresponds to a distribution unit.

Fifth Embodiment

Hereinafter, a fifth embodiment of the present disclosure will be described with reference to the drawings.

Figure 5:
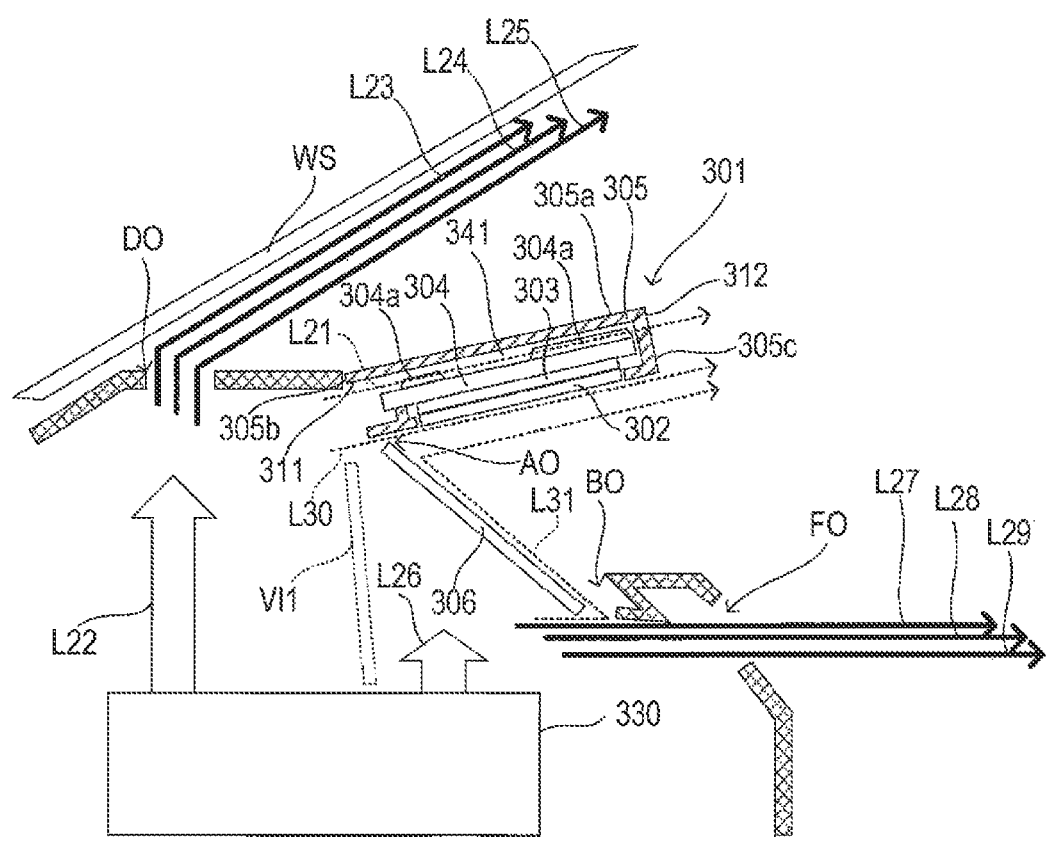
FIG. 5 is a cross-sectional view illustrating a display device according to a fifth embodiment.

As shown in FIG. 5, the display device 301 of the fifth embodiment is installed below the windshield WS of the vehicle, and includes a display 302, a circuit board 303, a back case 304, a decorative panel 305, and a reflecting mirror 306.

The display 302 is an organic EL display in which plural organic EL elements are arranged in a matrix to form a thin plate.

The circuit board 303 is a wiring board on which various electronic components for controlling the display 302 are mounted. The circuit board 303 is installed on a side of the display 202 opposite to the display screen formed in a thin plate shape.

The back case 304 is formed in a plate shape with a material having high thermal conductivity, and is installed on a side of the circuit board 303 opposite to the display 302. The back case 304 includes a heat radiation fin 304a. The heat radiation fin 304a is formed on a surface of the back case 304 opposite to the circuit board 303 so as to extend along the front-rear direction of the vehicle.

The decorative panel 305 is formed in a box shape. The display 302, the circuit board 303, and the back case 304 are housed inside the decorative panel 305 so as to cover other than the display screen of the display 302.

The display 302, the circuit board 303, the back case 304, and the decorative panel 305 are integrated by being housed inside the decorative panel 305, and attached so that the display screen of the display 302 faces downward.

The decorative panel 305 houses the display 302, the circuit board 303, and the back case 304 so that the upper surface 305a of the decorative panel 305 is separated from the back case 304. As a result, an air layer 341 is formed between the decorative panel 305 and the back case 304.

The reflecting mirror 306 is installed below the display 302, and reflects the display light emitted from the display screen of the display 302 toward at least the driver seat of the vehicle. As a result, the driver of the vehicle can visually recognize the image displayed by the display device 301. The rectangular VI1 shown by the broken line indicates the position of the virtual image visually recognized by the driver.

An air intake port 311 penetrating the front side surface 305b is formed on the front side surface 305b of the decorative panel 305.

An air discharge port 312 penetrating the rear side surface 305c is formed on the rear side surface 305c of the decorative panel 305.

The air taken into the decorative panel 305 from the air intake port 311 passes between the decorative panel 305 and the back case 304 rearward of the vehicle as shown by the arrow L21. Further, the air passes through the air discharge port 312 and is discharged to the outside of the decorative panel 305.

A defroster outlet DO is formed on the front side of the display 302 to blow air toward the windshield WS. A face outlet FO is formed near the lower end of the reflecting mirror 306 and at the rear side of the reflecting mirror 306.

Further, an upper outlet AO is formed at the upper end of the reflecting mirror 306, and a lower outlet BO is formed at the lower end of the reflecting mirror 306.

As indicated by the arrows L22, L23, L24, and L25, a part of the air discharged from the air conditioner 330 is discharged from the defroster outlet DO. Then, the air discharged from the defroster outlet DO flows along the inner surface of the windshield WS as indicated by the arrows L23, L24, and L25.

As indicated by the arrows L26, L27, L28, and L29, a part of the air discharged from the air conditioner 330 is discharged from the face outlet FO. Then, the air discharged from the face outlet FO flows in the horizontal direction rearward of the vehicle as indicated by the arrows L27, L28, and L29.

As shown by the arrow L30, a part of the air discharged from the air conditioner 330 is discharged from the upper outlet AO. Then, the air discharged from the upper outlet AO flows rearward of the vehicle along the display screen of the display 302 as shown by the arrow L30.

As shown by the arrow L31, a part of the air discharged from the air conditioner 330 is discharged from the lower outlet BO. Then, the air discharged from the lower outlet BO flows upward along the surface of the reflecting mirror 306.

In the display device 301, an air flow path is formed inside the decorative panel 305 in which the display 302, the circuit board 303, and the back case 304 are housed, such that air flows from the air intake port 311 to the air discharge port 312. When the air flowing through the air flow path (hereinafter referred to as internal circulation air) comes into contact with the display 302, the circuit board 303, and the back case 304, the heat generated in the display 302, the circuit board 303, and the back case 304 is transmitted to the internal circulation air and discharged from the air discharge port 312 to the outside of the decorative panel 305. As a result, the display device 301 can improve the heat dissipation efficiency.

Further, the air layer 341 is formed between the decorative panel 305 and the back case 304. As a result, the display device 301 can suppress the heat generated in the decorative panel 305 from being transmitted to the display 302, the circuit board 303, and the back case 304 when external light is irradiated on the upper surface 305a of the decorative panel 305.

Further, since the air discharged from the upper outlet AO flows along the display screen of the display 302, it is possible to restrict dust from adhering to the display screen of the display 302.

Further, since the air discharged from the lower outlet BO flows along the surface of the reflecting mirror 306, it is possible to restrict dust from adhering to the surface of the reflecting mirror 306.

Sixth Embodiment

Hereinafter, a sixth embodiment of the present disclosure will be described with reference to the drawings.

Figure 6:
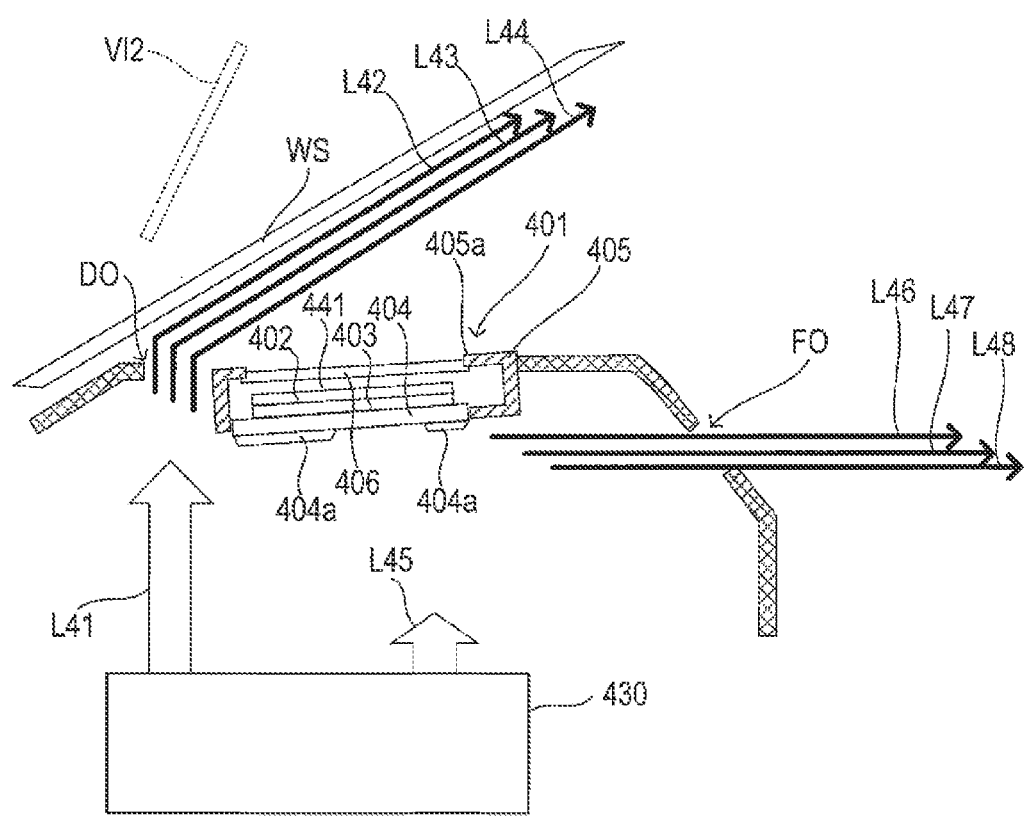
FIG. 6 is a cross-sectional view illustrating a display device according to a sixth embodiment.

As shown in FIG. 6, the display device 401 of the sixth embodiment is installed below the windshield WS of the vehicle, and includes a display 402, a circuit board 403, a back case 404, a decorative panel 405, and a cover glass 406.

The display 402 is an organic EL display in which plural organic EL elements are arranged in a matrix to form a thin plate.

The circuit board 403 is a wiring board on which various electronic components for controlling the display 402 are mounted. The circuit board 403 is installed on the side of the display 402 opposite to the display screen formed in the shape of a thin plate.

The back case 404 is formed in a plate shape with a material having high thermal conductivity, and is installed on the side of the circuit board 403 opposite to the display 402. The back case 404 includes a heat radiation fin 404a. The heat radiation fin 404a is formed on the surface of the back case 404 opposite to the circuit board 403 so as to extend along the front-rear direction of the vehicle.

The decorative panel 405 is formed in a box shape, and houses the display 402, the circuit board 403, and the back case 404 to cover, except for the back surface of the back case 404 (on which the heat radiation fin 404a is formed).

The display 402, the circuit board 403, the back case 404, and the decorative panel 405 which are integrated by being housed inside the decorative panel 405 are attached so that the display screen of the display 402 faces upward.

An opening is formed in the upper surface 405a of the decorative panel 405 in a region facing the display screen of the display 402. The cover glass 406 is a member formed in a plate shape with a material that transmits the display light emitted from the display 402. The cover glass 406 closes the opening of the decorative panel 405 and is separated from the display screen of the display 402. As a result, an air layer 441 is formed between the cover glass 406 and the display 402.

The display 402 irradiates the windshield WS with display light for displaying an image from the lower side of the windshield WS. As a result, a virtual image is projected on the windshield WS, and a driver on the driver seat can visually recognize the projected virtual image by superimposing it on the actual scenery in front of the vehicle. The rectangular VI2 shown by the broken line indicates the position of the virtual image visually recognized by the driver.

A defroster outlet DO is formed on the front side of the display device 401 to blow air toward the windshield WS. A face outlet FO is formed below the back case 404 and at the rear side of the back case 404.

As indicated by the arrows L41, L42, L43, and L44, a part of the air discharged from the air conditioner 430 is discharged from the defroster outlet DO. Then, the air discharged from the defroster outlet DO flows along the inner surface of the windshield WS as shown by the arrows L42, L43, and L44.

As indicated by the arrows L45, L46, L47, and L48, a part of the air discharged from the air conditioner 430 is discharged from the face outlet FO. Then, the air discharged from the face outlet FO flows in the horizontal direction rearward of the vehicle as indicated by the arrows L46, L47, and L48.

In the display device 401, the air layer 441 is formed between the cover glass 406 and the display 402. As a result, the display device 401 can suppress the heat generated in the cover glass 406 from being transferred to the display 402, the circuit board 403, and the back case 404 when external light is irradiated to the cover glass 406.

The embodiments of the present disclosure are described, but the present disclosure is not limited to the embodiments, and can be implemented with various modifications.

Figure 7:
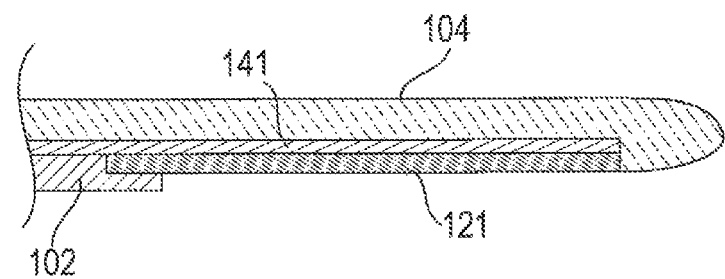
FIG. 7 is a diagram showing an arrangement of a heat insulating member.
Figure 8:
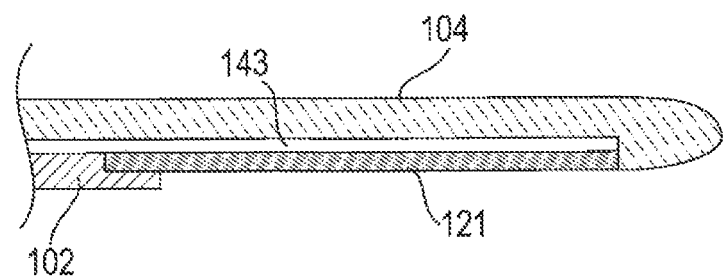
FIG. 8 is a diagram showing an arrangement of an air layer.

For example, in the second embodiment, the back frame 102 is arranged between the heat insulating visor 104 and the irradiation unit 121. However, as shown in FIG. 7, the heat insulating member 141 may be arranged among the heat insulating visor 104, the back frame 102 and the irradiation unit 121. Further, as shown in FIG. 8, an air layer 143 may be formed among the heat insulating visor 104, the back frame 102, and the irradiation unit 121. In this case, it is possible to restrict the irradiation unit 121 from becoming hot due to the heat received by the sunlight on the heat insulating visor 104, due to the air layer 143 or the heat insulating member 141 arranged among the back frame 102, the irradiation unit 121 and the heat insulating visor 104 that covers the back frame 102 and the irradiation unit 121. The heat insulating visor 104 corresponds to a covering member.

Further, the back frame 102 may be supported by contact with the irradiation unit 121, such as the back surface, where heat concentration is low or where heat dissipation is high in the irradiation unit 121.

Further, the thickness of the heat insulating member 141 or the air layer 143 between the heat insulating visor 104 and the irradiation unit 121 may be increased or decreased according to the position of the irradiation unit 121 (for example, the center of the cabin, in front of the driver seat, in front of the front passenger seat and the like), the angle of the irradiation unit 121, the design shape of the heat insulating visor 104, or the thickness of the heat insulating visor 104 so that the thermal influence becomes uniform or the thermal influence does not exceed a threshold value.

In addition, the heat insulating member may be strengthened depending on the characteristics of the windshield WS for cutting the wavelength of external light (such as ultraviolet or infrared), or the magnitude of the heat received by the decorative color of the top surface of the heat insulating visor 104 (such as black, white or beige). The amount of heat received by black is higher than that by white. The heat insulating member may be strengthened in the type, the thickness, the base material such as leather or artificial leather, the bonding layer or the adhesive layer (that is, the layer containing air).

Figure 9:
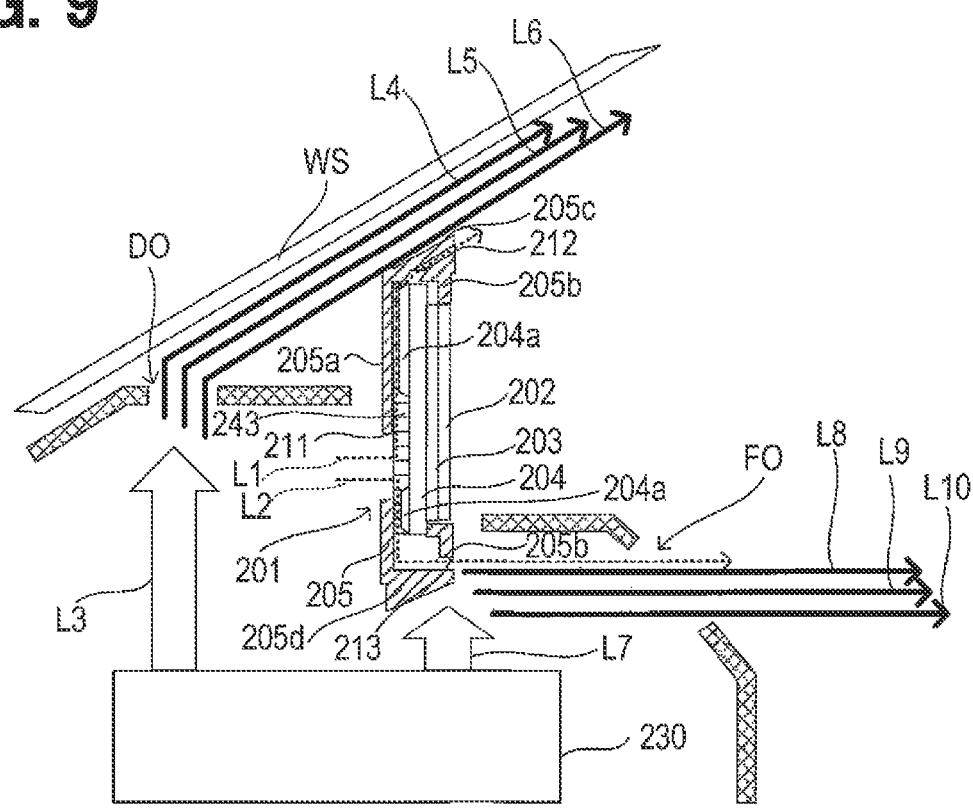
FIG. 9 is a cross-sectional view illustrating a display device of another embodiment.

In the third embodiment, the air layer 241 is formed between the decorative panel 205 and the back case 204. However, as shown in FIG. 9, the heat insulating member 243 may be arranged between the decorative panel 205 and the back case 204.

In the fifth embodiment, the air layer 341 is formed between the decorative panel 305 and the back case 304. However, a heat insulating member may be arranged between the decorative panel 305 and the back case 304.

In the sixth embodiment, the air layer 441 is formed between the cover glass 406 and the display 402. However, a heat insulating member may be arranged between the cover glass 406 and the display 402.

The air conditioning duct may vibrate with vibrations from the vehicle, engine or air conditioner, depending on the shape of the air conditioning duct. Simple contact between the back frame 2 and the air conditioning duct 20 may cause abnormal noise or vibration transmission. Therefore, in order to improve the heat transfer property, a heat conductive gel or the like may be installed between the back frame 2 and the air conditioning duct 20 to optimally design the hardness of the heat conductive gel. Thereby, the display device 1 can improve the vibration control property and the heat conduction efficiency.

In addition, for places where you do not want to change the temperature or where you do not want to transmit vibration, thermal insulation is performed by forming an air layer by intentionally taking a large gap or installing a heat insulating member, to be distinguished from the area for improving the heat transmission.

Figure 10:
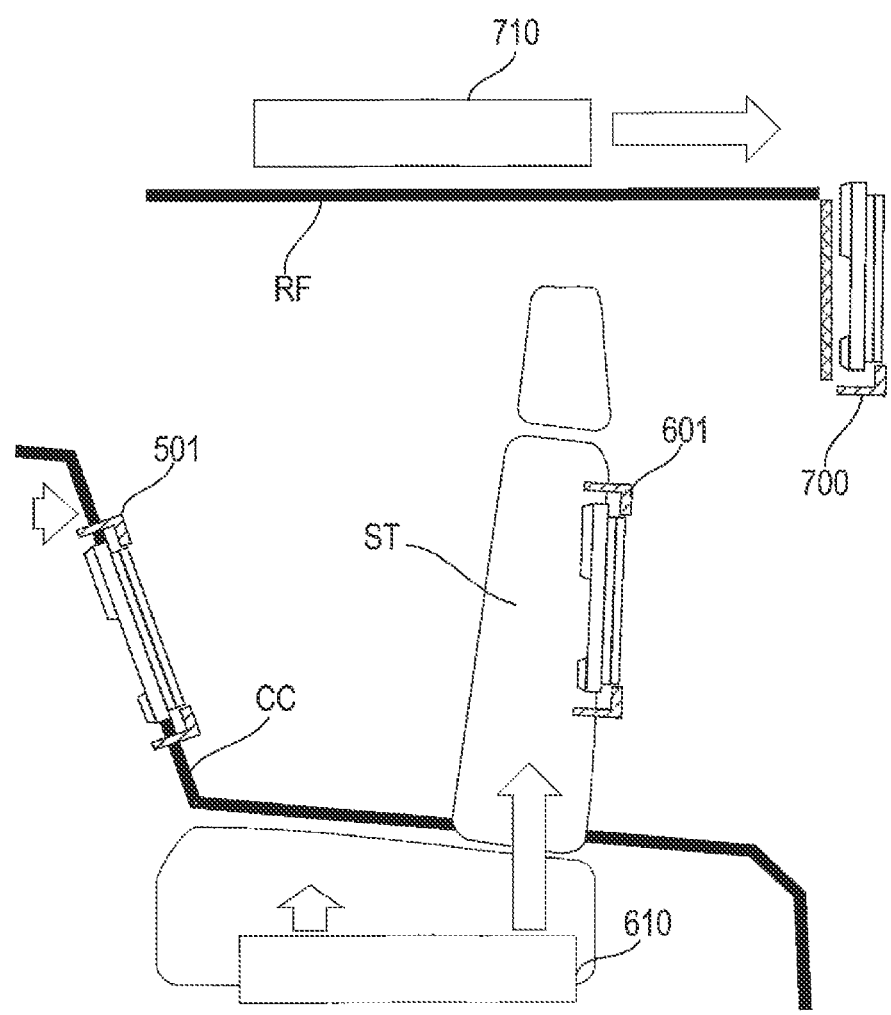
FIG. 10 is a diagram showing an arrangement of a display device of another embodiment.

In the above embodiments, the display device 1, 101, 201, 301, 401 is installed below the windshield WS. However, as shown in FIG. 10, a display device may be installed on a center console CC, a seat ST and/or a roof RF.

A display device 501 is installed on the center console CC, and is configured to take in air released from the air conditioner installed on the front side of the center console CC.

A display device 601 is installed on the seat ST. The display device 601 is configured to take in air discharged from a seat air conditioner 610 that circulates air inside the seat ST.

A display device 700 is installed on the roof RF. The display device 700 is configured to take in air discharged from a roof air conditioner 710 that circulates air above the roof RF.

A display device may be installed on a door of the vehicle.

When the decorative panel is made of black leather or artificial leather, the decorative panel easily receives the heat of outside light. For this reason, the base material of the leather may be an adiabatic non-woven fabric or foam containing a large amount of air, such that the heat insulating property may be improved. Alternatively, an adhesive having a dot or geometric pattern, which can contain an air layer, may be used.

A material having both electric and thermal conductivity properties (for example, copper foil tape, carbon atom-based carbon fiber or felt, graphene sheet, etc.) may be arranged between the back case and the circuit board, so as to suppress electromagnetic noise and static electricity and improve thermal conductivity.

The air conditioner for a vehicle may perform an optimum cooling assistance and heat dissipation assistance for the display device by adjusting on/off or selecting an air flow (for example, cold air, warm air, outside air, indoor circulation, etc.) by opening and closing an air mix damper according to the indoor/outdoor environment, air conditioning settings, detection result by a temperature sensor, detection result by a solar radiation sensor, and a detection result by a humidity sensor.

Condensation may occur due to temperature differences in products and instrument panel components having a multi-layer structure, depending on the conditions. In that case, (i) a control that promotes cooling while restricting condensation, (ii) a stepwise cooling control that does not cause a sudden temperature difference, or (iii) a defroster control to clear the condensation within a range where there is no thermal influence on the product may be carried out using the function in the above modifications. In addition, a coating for suppressing fogging may be applied to the display device and the glass front component as a preventive measure.

In addition, even if the condensation occurs under peculiar conditions, a water-resistant wall, a diversion path, and a drainage path may be set for the expected path of condensation water to protect the connector and circuit components.

The multiple functions of one component in the above embodiment may be realized by multiple components, or a function of one component may be realized by multiple components. In addition, multiple functions of multiple components may be realized by one component, or a single function realized by multiple components may be realized by one component. Moreover, part of the configuration of the above-described embodiment may be omitted. Further, at least part of the configuration of the above-described embodiment may be added to or replaced with the configuration of another embodiment described above.

What is claimed is:
1. A display device for a vehicle comprising:
an irradiation unit configured to irradiate a display light for an occupant of the vehicle to display an image;
a storage unit housing the irradiation unit so as to expose a display screen to which the display light is irradiated, the storage unit having an air intake port to take in air and an air discharge port to discharge the air;
a confluence portion configured to merge a first exhaust air discharged from the air discharge port and a second exhaust air discharged from an air conditioner for a cabin of the vehicle through an air outlet arranged in the cabin, wherein the confluence portion is defined such that a first flow direction in which the first exhaust air flows and a second flow direction in which the second exhaust air flows coincide with each other; and a forced air cooling fan disposed at the air intake port to circulate air so that air outside the storage unit flows into the storage unit through the air intake port.

2. The display device according to claim 1, wherein
a defroster outlet is formed in a wall different from the storage unit at a front side of the display screen to blow air toward a windshield,
a part of the air discharged from the air conditioner is discharged from the defroster outlet toward the windshield to flow along an inner surface of the windshield and merges with the air circulated by the forced air cooling fan passing through the storage unit,
a face outlet is formed in a wall different from the storage unit at a rear side of the display screen to blow air toward an upper body of the occupant,
the face outlet is formed at a rear side of the air discharge port so as to face the air discharge port, and
a part of the air discharged from the air conditioner is discharged from the face outlet to flow rearward of the vehicle and merges with the air circulated by the forced air cooling fan passing through the storage unit.

3. The display device according to claim 1, wherein
a defroster outlet is formed at a front side of the display screen to blow air toward a windshield,
a part of the air discharged from the air conditioner is discharged from the defroster outlet toward the windshield to flow along an inner surface of the windshield and merges with the air circulated by the forced air cooling fan passing through the storage unit,
a face outlet is formed at a rear side of the display screen and a rear side of the air discharge port, and
a part of the air discharged from the air conditioner is discharged from the face outlet to flow rearward of the vehicle and merges with the air circulated by the forced air cooling fan passing through the storage unit such that air flows on both the front side and the rear side of the display screen.

4. The display device according to claim 1, wherein
the display device is installed at least one of below the windshield, on a center console, in a seat, in a roof and in a door of the vehicle.

5. A display device for a vehicle comprising:
an irradiation unit configured to irradiate a display light for an occupant of the vehicle to display an image;
a storage unit housing the irradiation unit so as to expose a display screen to which the display light is irradiated, the storage unit having an air intake port to take in air and an air discharge port to discharge the air;
a confluence portion configured to merge a first exhaust air discharged from the air discharge port and a second exhaust air discharged from an air conditioner for a cabin of the vehicle through an air outlet arranged in the cabin, wherein the confluence portion is defined such that a first flow direction in which the first exhaust air flows and a second flow direction in which the second exhaust air flows coincide with each other; and
a heat insulating member is arranged between the storage unit and the irradiation unit.

6. The display device according to claim 5, wherein
a defroster outlet is formed in a wall different from the storage unit at a front side of the display screen to blow air toward a windshield,
a part of the air discharged from the air conditioner is discharged from the defroster outlet toward the windshield to flow along an inner surface of the windshield and merges with the air passing inside of the storage unit,
a face outlet is formed in a wall different from the storage unit at a rear side of the display screen to blow air toward an upper body of the occupant,
the face outlet is formed at a rear side of the air discharge port so as to face the air discharge port, and
a part of the air discharged from the air conditioner is discharged from the face outlet to flow rearward of the vehicle and merges with the air passing inside of the storage unit.

7. The display device according to claim 5, wherein
a defroster outlet is formed at a front side of the display screen to blow air toward a windshield,
a part of the air discharged from the air conditioner is discharged from the defroster outlet toward the windshield to flow along an inner surface of the windshield and merges with the air passing inside of the storage unit,
a face outlet is formed at a rear side of the display screen and a rear side of the air discharge port, and
a part of the air discharged from the air conditioner is discharged from the face outlet to flow rearward of the vehicle and merges with the air passing inside of the storage unit such that air flows on both the front side and the rear side of the display screen.

8. The display device according to claim 5, wherein
the display device is installed at least one of below the windshield, on a center console, in a seat, in a roof and in a door of the vehicle.

* * * * *